United States Patent
Wang et al.

(10) Patent No.: US 7,535,588 B2
(45) Date of Patent: May 19, 2009

(54) SYSTEM AND METHOD TO COMMUNICATE TO CONTROLLER MAPPED BY PRINT SERVER

(75) Inventors: Jianxin Wang, Trabuco Canyon, CA (US); Truc Nguyen, San Diego, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 953 days.

(21) Appl. No.: 10/675,713

(22) Filed: Sep. 30, 2003

(65) Prior Publication Data
US 2005/0069361 A1   Mar. 31, 2005

(51) Int. Cl.
*G06F 3/12* (2006.01)
*G06F 3/00* (2006.01)

(52) U.S. Cl. .......................... 358/1.15; 710/8; 719/321

(58) Field of Classification Search ................ 358/1.1, 358/1.15, 1.16; 719/321, 330; 710/8, 15; 400/61; 370/352, 389; 709/223, 227, 247, 709/203
See application file for complete search history.

(56) References Cited

U.S. PATENT DOCUMENTS

| | | |
|---|---|---|
| 5,228,118 A | 7/1993 | Sasaki |
| 5,580,177 A | 12/1996 | Gase et al. |
| 5,664,195 A | 9/1997 | Chatterji |
| 5,668,992 A | 9/1997 | Hammer et al. |
| 5,870,610 A | 2/1999 | Beyda |
| 6,009,480 A | 12/1999 | Pleso |
| 6,023,585 A | 2/2000 | Perlman et al. |
| 6,184,998 B1 | 2/2001 | Tebeka |
| 6,210,051 B1 | 4/2001 | Sakurai |
| 6,269,481 B1 | 7/2001 | Perlman et al. |
| 6,301,012 B1 | 10/2001 | White et al. |
| 6,493,104 B1 | 12/2002 | Cromer et al. |
| 6,530,018 B2 | 3/2003 | Fleming, III |
| 6,959,437 B2 * | 10/2005 | Schacht et al. ............. 719/321 |
| 7,028,308 B2 * | 4/2006 | Kim ........................... 719/321 |
| 7,253,915 B2 * | 8/2007 | Kemp et al. ................ 358/1.15 |
| 2003/0005097 A1* | 1/2003 | Barnard et al. ............. 709/223 |
| 2003/0055958 A1 | 3/2003 | Russell et al. |
| 2003/0128386 A1* | 7/2003 | Kim ........................... 358/1.15 |
| 2004/0030809 A1* | 2/2004 | Lozano et al. ................. 710/8 |

\* cited by examiner

*Primary Examiner*—King Y Poon
*Assistant Examiner*—Neil R McLean
(74) *Attorney, Agent, or Firm*—Tucker Ellis & West LLP

(57) ABSTRACT

The present invention is directed to a method and system for a printer driver to retrieve information from a printer mapped to a printer server. A printer driver residing on a client machine searches for all printers accessible by the client machine. A user is then prompted to select one of the printers discovered. The client machine then stores the printer IP address and the printer network path information in the registry. The actual port of the discovered printer is then ascertained using the information garnished from the printer server and the information stored in the client machine registry. The printer driver then communicates directly with the printer using the printer IP address and the network path. The system of the present invention utilizes two software components for searching and storing the printer IP address and the printer network path.

24 Claims, 3 Drawing Sheets

SYSTEM AND METHOD TO COMMUNICATE TO CONTROLLER MAPPED BY PRINT SERVER

BACKGROUND OF THE INVENTION

The present invention pertains generally to printer driver configurations. More particularly, the present invention is related to retrieve and communicate information by a client machine from a printer connected to a local area network.

As a printer driver is downloaded, e.g., point-and-print, from a print server in a Windows NT domain, the port information of the shared driver in the print server is not available to the downloaded driver. Instead of showing \\PrinterName\PrintQueue as would a locally installed driver, the port of such downloaded driver shows \\PrintServerName\SharedDriverName, which is a pseudo port or rather, a link path to the print server. Therefore, downloaded drivers cannot communicate with the printer to obtain information from the printer due to the misrepresentation of port information, although print jobs will be successfully sent to the real port instead of the pseudo port. Such an example of communications problems occurs on a computer network using Novell software, particularly Novell NetWare. A printer driver is mapped to a local port, such as LPT1, which is captured as the Novell Printer Port. However, in this circumstance, the client computer has no information about the printer port to which it is actually mapped.

Novell NetWare utilizes a proprietary addressing system similar to the Internet Protocol communications protocol, referred to as Internetwork Packet Exchange protocol, or IPX. Internet Protocol, or IP, addressing is based on the concept of hosts and networks. A host is essentially anything on the network that is capable of receiving and transmitting IP packets on the network, such as a workstation or a router. It is not to be confused with a server: servers and client workstations are all IP hosts. The hosts are connected together by one or more networks. The IP address of any host consists of its network address plus its own host address on the network.

IP addressing, unlike, IPX addressing, uses one address containing both network and host address. How much of the address is used for the network portion and how much for the host portion varies from network to network. An IP address is 32 bits wide, and as discussed, it is composed of two parts: the network number, and the host number [1, 2, 3]. By convention, it is expressed as four decimal numbers separated by periods, such as "200.1.2.3" representing the decimal value of each of the four bytes. Valid addresses thus range from 0.0.0.0 to 255.255.255.255, a total of about 4.3 billion addresses. An IPX address consists of a 4-byte Network Number, a 6-byte Node Number, and a 2-byte Socket Number. The node number is usually the hardware address of the interface card, and must be unique inside the particular IPX network. The network number must be the same for all nodes on a particular physical network segment. Socket numbers correspond to the particular service being accessed.

Thus there is a need for a method and system to retrieve information on a specific printer irrespective of the printer port to which the printer is mapped.

SUMMARY OF THE PRESENT INVENTION

In accordance with the present invention, there is provided a method and system for communicating with a printer over a local area network.

Further in accordance with the present invention, there is provided a method and system which enables a downloaded driver to obtain information from and effectively communicate with a printer.

Still further in accordance with the present invention, there is provided a method and system for a printer driver on a client machine to communicate with a network printer. The method begins by searching a computer network for at least one accessible printer. Once finding at least one printer the client machine has access to, a user is prompted to select one of the at least one accessible printers. The network address corresponding to the selected accessible printer and the network path corresponding to the selected accessible printer are stored in the client machine registry. The actual port to the selected accessible printer is then mapped to the client machine using the network address of the printer and the network path of the printer.

Further in accordance with the present invention, there is provided a system for a printer driver to communicate with a network printer. The system consists of two software components. A first computer program includes means adapted for exporting a function to the printer driver, means adapted for searching a local area network for a printer accessible to a client machine, and means adapted for mapping a network address corresponding to the accessible printer and a network path corresponding to the accessible printer in a registry of the client machine. The second software component comprises a second computer program containing instructions for the first computer program to search for the accessible printer on the local area network.

Additional objects, advantages and novel features of the invention will be set forth in part in the description which follows, and in part will become apparent to those skilled in the art upon examination of the following or may be learned by practice of the invention. The objects and advantages of the invention may be realized and attained by various structures and methods as covered by the patent claims.

BRIEF DESCRIPTION OF THE DRAWINGS

The accompanying figures incorporated in and forming a part of the specification, illustrates several aspects of the present invention, and together with the description serve to explain the principles of the invention. In the figures.

DETAILED DESCRIPTION OF PREFERRED AND ALTERNATIVE EMBODIMENTS

The present invention is described below as a method invoked upon a computer system. Directed to a printer and printer-controller, the present invention pertains to a method and system for a printer driver to retrieve information from the printer to which a print server is currently mapped. As envisioned by the present invention, the printer driver may be downloaded from the printer server, or may be inherent to the software running on a client machine. An example, as contemplated herein, of the latter is the Novell NetWare application. The system envisioned by the present invention consists of two software components. The first component is a mapping dynamic link library running in the client machine. When a driver requires communication with a printer, mapping dynamic link library first detects whether the driver is mapped to a local port. If the driver is indeed mapped to a local port, the mapping dynamic link library invokes the second component of the present system, the searching dynamic link library. The searching dynamic link library includes instructions for the mapping dynamic link library to search the entire local area network to which the client machine has access for printers. The mapping dynamic link library then enables a user to select one of the discovered printers for information and access. Upon selection of a printer by the user, the mapping dynamic link library saves the printer name along with the pseudo port information in the Windows registry. The mapping dynamic link library is now able to pass the real port information to the driver so the driver knows which printer to access.

Figure 1:
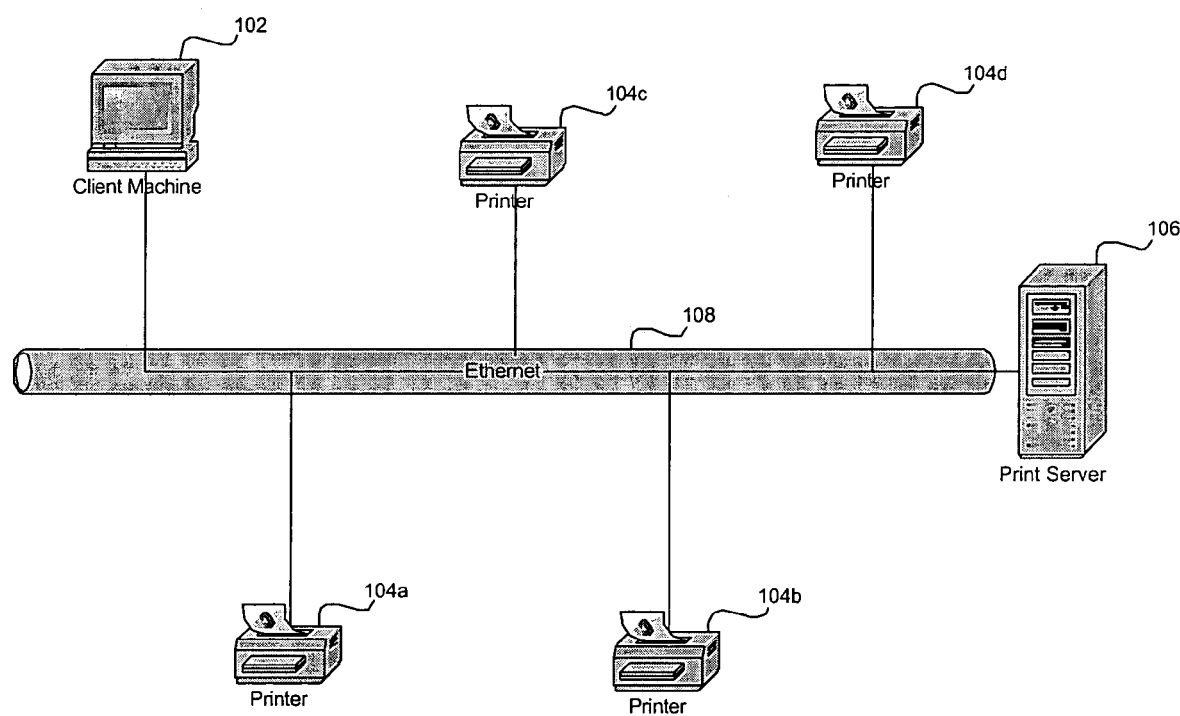
FIG. 1 is a diagram representative of a computer system having a plurality of networked printers.

Turning first to FIG. 1, there is shown an exemplary computer system on which the present invention may be implemented. The system, as shown, exists on a local area network 108 using Ethernet operations. However, it will be appreciated by those in the art that the present invention need not be limited to Ethernet, and other network configurations, such as Token rings and the like, may be substituted. Returning to FIG. 1, communicatively coupled to the local area network 108 is a client machine 102. A suitable client machine is any suitably networked computer or data terminal as will be appreciated by one of ordinary skill in the art. Also coupled to the local area network 108 is server 106. The operations of the server 106 will be apparent to those skilled in the art and will depend upon the network configuration of the local area network. For exemplification, there are shown a plurality of network connected printers 104a, 104b, 104c, and 104d. It will be understood by those skilled in the art that the number of printers connected to the local area network 108 will not be limited to the number shown in the present system. The number of printers may any number from one printer configured to operate on the local area network 108 or a number greater than the four shown. Furthermore, the number of client machines 102 connected to the local area network 108 need not be limited to the single machine shown.

In operation, the server 106 may be a print server, storing any number of printer drivers not necessarily installed on the client machine 102. The client machine 102 may access the print server 106 over the local area network 108 for a printer driver needed, depending upon the current configuration of client machine 102. For example, client machine 102 has installed printer drivers for printers 104a, 104b and 104c, but lacks the drivers necessary to request a print job to be performed by printer 104d. In such an occurrence, client machine 102 will access print server 106 over the local area network 108 for the printer driver required to successfully initiate and complete a print job on printer 104d. As envisioned by the present invention, the two components comprising the system described herein reside on client machine 102. The components (not shown) are implemented in the form of computer readable instructions, thereby enabling the client machine 102 to determine the actual printer port the printer, any of 104a, 104b, 104c or 104d, is currently mapped.

Figure 2:
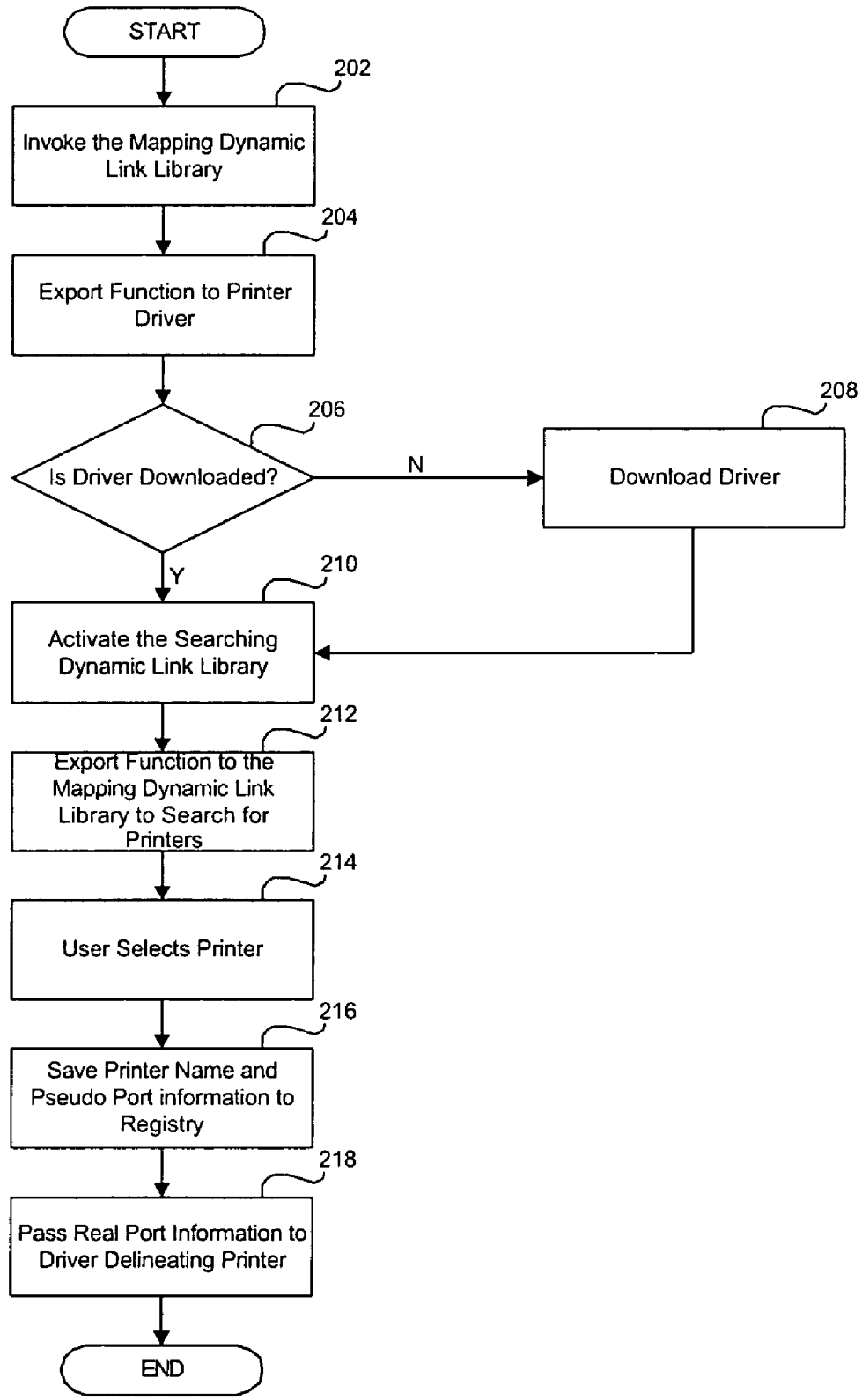
FIG. 2 is a flow chart illustrating a general implementation of the method of the present invention.

FIG. 2 presents a flow chart depicting the operation of the method contemplated by the present invention. The method begins at step 202 when client machine 102, activates the first component of the system, the mapping dynamic link library. The mapping dynamic link library component exports a function at 204 to the printer driver, in effect querying the driver to determine if the driver is present on client machine 102. As used herein, it will be appreciated by those skilled in the art that the term function may include, but need not be limited to, any form of machine readable instruction, source code, binary data, or the like, capable of instructing a machine in operation. The mapping dynamic link library progresses to step 206, wherein the determination is made regarding the presence of the printer driver on the client machine 102.

In the event that a negative determination is made at 206, that is, the printer driver is not present on the client machine 102, the print server 106 is contacted for the appropriate driver at step 208. Over the local area network 108, the print server transmits the appropriate printer driver to the client machine 102 for incorporation therein. The mapping dynamic link library then proceeds to step 210 where the second component, the searching dynamic link library is invoked. Similarly, one of skill in the art will appreciate that upon the occurrence of a positive determination at step 206, that is the printer driver is present on client machine 102, the mapping dynamic link library will proceed to step 210 and activate the second component, the searching dynamic link library.

The searching dynamic link library component, initiated at step 210, is preferably a dynamic link library that exports a function back to the mapping dynamic link library at step 212. The contents of the function exported from the searching dynamic link library to the mapping dynamic link library at 212 include instructions for the mapping dynamic link library to search the entire local area network 108 to which the client machine 102 has access and find all printers located on the local area network 108, that is to the printers 104a, 104b, 104c, and 104d. The discovered printers 104a, 104b, 104c, and 104d are then displayed on client machine 102. At step 214, a user is prompted to select a printer from the discovered printers 104a, 104b, 104c, and 104d.

Upon selection of a printer from the discovered printers 104a, 104b, 104c, and 104d, the printer name and pseudo port information of the selected printer is saved to the Windows registry at step 216. The Internet Protocol, or IP, address of the printer selected by the user is then saved in the registry, together with the network path to the print server. This step is exceedingly useful in the operation of a network using point-and-print procedures. Point-and-print is preferably the name given to sharing printer drivers, wherein the drivers are stored on a print server 106. The downloaded driver of the client machine' 102 would lack the port information of the shared driver residing in the print server 106. Thus, the client machine 102, in the case of the downloaded driver, would be unable to display the port information of the printer because the shared driver does not allow it.

Having saved the printer name and pseudo port information to the Windows registry, the mapping dynamic link library proceeds to step 218. The mapping dynamic link library is now able to pass the real port information to the printer driver on the client machine 102. The client machine is then able to effectively communicate with the selected printer over the local area network 108. For example, a user has selected printer 104a, which had been discovered during the search of the local area network 108 by the mapping dynamic link library. The pseudo port and printer name of printer 104a are then stored as a registry key in the Windows registry of the operating system of the client machine 102. Prior to application of the present invention, the client machine 102 would have to rely on the print server 106 to effectively communicate with the printer 104a. When the user selects the print option on the client machine 102, for the selected printer 104a, the client machine 102 printer driver may effectively communicate with the selected printer 104a, without having to first query through the printer server 108.

The method and system, as discussed above, may more readily be explainable by the Novell NetWare embodiment. A process, the mapping dynamic link library process discussed above, is invoked that searches the entire local area network 108 for printers to which the client machine has access. As the user selects the controller, e.g., the printer processing and control unit, the Internetwork Packet Exchange, or IPX, address of the printer, along with the network path to the selected printer, are saved to the Windows Registry. In the event that the local port captured during this operation is a Novell printer port, then the port name along with the printer network path are also saved in the Windows Registry by the Novell client machine 102. It then follows that when a printer driver residing on the client machine 102 needs to talk to the controller, it first checks if it is mapped to a local port, then verifies if the port is being captured as a Novell printer port. It then finds its IPX address based on the printer network path.

Figure 3:
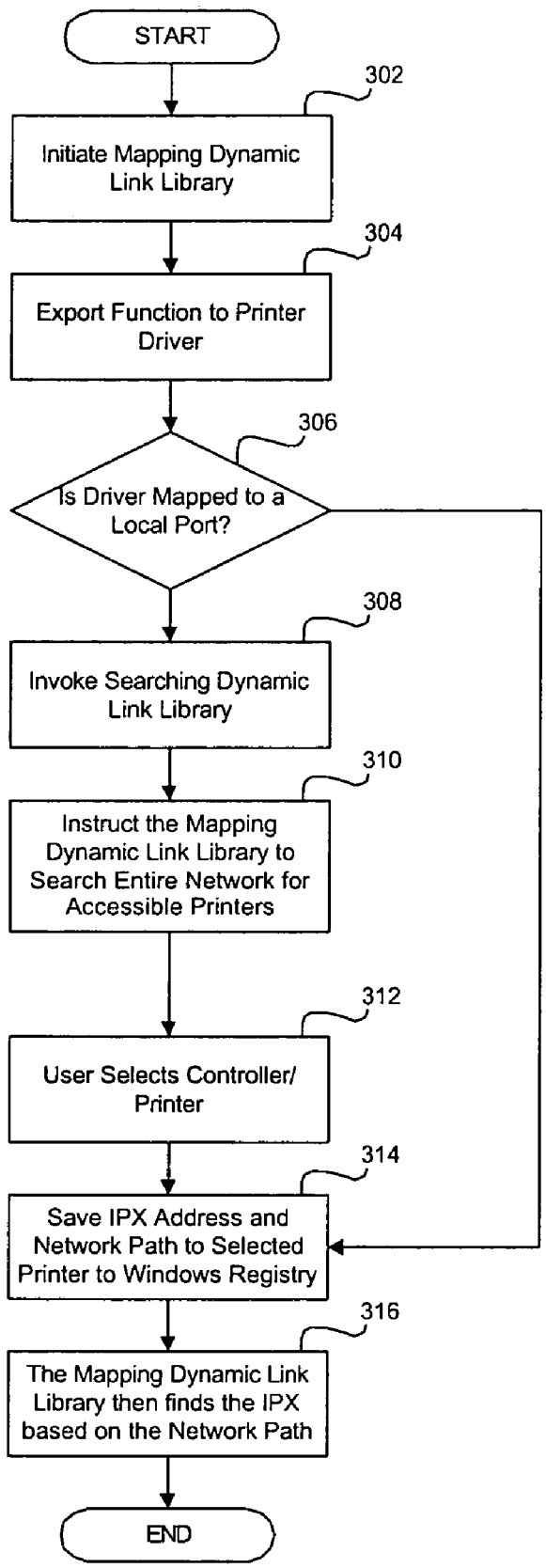
FIG. 3 is a flow chart illustrating a preferred embodiment of the method of the present invention.

The foregoing may more easily be understood by examination of the implementation of the present invention in the Novell NetWare environment, represented by FIG. 3 as a flow chart depicting the operation of the two components of the present invention in the Novell NetWare environment. Beginning at step 302, the mapping dynamic link library is initiated. The mapping dynamic link library exports a function to the printer driver residing on the client machine 102 at step 304. The mapping dynamic link library then queries the client machine 102 to determine at step 306 whether or not the printer driver is mapped to a local port.

In the event that the printer driver is mapped to local port, the mapping dynamic link library instructs the client machine 102 to proceed to step 308, wherein the second component of the present invention is activated the searching dynamic link library, also a dynamic link library, instructs the mapping dynamic link library, at step 310, to search the entire local area network 108 for accessible printers/controllers 104a, 104b, 104c and 104d. The mapping dynamic link library then prompts a user at step 312 to select from one of the discovered accessible printers/controllers 104a, 104b, 104c and 104d. The IPX and network path of the accessible printer/controller selected by the user is saved to the Windows Registry at step 314. The mapping dynamic link library then finds at step 316 the IPX based on the network path. The client machine 102 is then able to query the selected accessible printer for information without requiring access through or connection by the print server 106.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for a printer driver on a client machine to communicate with a network printer communicatively coupled to a print server, comprising the steps of:
   loading a shared printer driver from an associated print server to a client machine wherein the loaded printed driver maps print output to a default print queue;
   searching a computer network for at least one network accessible printer corresponding to the default print queue, which network accessible printer is accessible by the client machine via a data connection between the printer and an associated server;
   selecting at least one network accessible printer corresponding to the default print queue, which network accessible printer is located by an associated user;
   retrieving identifier data associated with each selected network accessible printer;
   retrieving a network address corresponding to the at least one network accessible printer selected by the user;
   storing the network address, corresponding identifier data, and a network path corresponding to the at least one selected network accessible printer in an internal value table of the client machine; and
   mapping a port from the at least one selected network accessible printer to a port on the client machine corresponding to the default print queue in accordance with the value table, wherein the default print queue is able to pass through an actual port associated therewith for bidirectional data communication, inclusive of printer status information, with the at least one selected network accessible printer via the downloaded printer driver and the data connection.

2. The method of claim 1, further comprising the step of exporting a function to the printer driver.

3. The method of claim 1, wherein the network address is an Internet Protocol address.

4. The method of claim 1, wherein the network address is a proprietary network protocol address.

5. The method of claim 4, wherein the proprietary network protocol is an Internet Packet Exchange protocol.

6. The method of claim 1, wherein the storing step further comprises storing an associated port name corresponding to the at least one selected network accessible printer in an internal value table of the client machine.

7. A system for a printer driver on a client machine to communicate with a network printer communicatively coupled to a print server, comprising:
   means adapted for loading a printer driver from an associated printer server to a client machine wherein the loaded printer driver maps print output to a default print queue;
   means adapted for searching a computer network for at least one network accessible printer corresponding to the default print queue, which network accessible printer is accessible by the client machine via a data connection between the printer and an associated server;
   means adapted for selecting at least one network accessible printer corresponding to the default print queue, which network accessible printer is located by an associated user;
   means adapted for retrieving identifier data associated with each selected network accessible printer;
   means adapted for retrieving a network address corresponding to the at least one network accessible printer selected by the user;
   means adapted for storing the network address, corresponding identifier data, and a network path corresponding to the at least one selected network accessible printer in an internal value table of the client machine; and
   means adapted for mapping a port from the at least one selected network accessible printer to a port on the client machine corresponding to the default print queue in accordance with the value table, wherein the default print queue is able to pass through an actual port associated therewith for bidirectional data communication, inclusive of printer status information, with the at least one selected network accessible printer via downloaded printer driver and the data connection.

8. The system of claim 7, further comprising means adapted for exporting a function to the printer driver.

9. The system of claim 7, wherein the network address is an Internet Protocol address.

10. The system of claim 7, wherein the network address is a proprietary network protocol address.

11. The system of claim 10, wherein the proprietary network protocol is an Internet Packet Exchange protocol.

12. The system of claim 7, further comprising means adapted for storing an associated port name corresponding to the at least one selected network accessible printer in an internal value table of the client machine.

13. A computer-implemented for a printer driver on a client machine to communicate with a network printer communicatively coupled to a print server, comprising the steps of:
   loading a shared printer driver from an associated print server to a client machine wherein the loaded printer driver maps print output to a default print queue;
   searching a computer network for at least one network accessible printer corresponding to the default print queue, which network accessible printer is accessible by the client machine via a data connection between the printer and an associated server;
   selecting at least one network accessible printer corresponding to the default print queue, which network accessible printer is located by an associated user;
   retrieving identifier data associated with each selected network accessible printer;
   retrieving a network address corresponding to at least one network accessible printer selected by a user;
   storing the network address, corresponding identifier data, and a network path corresponding to the at least one selected network accessible printer in an internal value table of the client machine; and
   mapping a port from the at least one selected network accessible printer to a port on a on the client machine corresponding to the default print queue in accordance with the value table, wherein the default print queue is able to pass though an actual port associated therewith for bidirectional data communication, inclusive of printer status information, with the at least one selected network accessible printer via the downloaded printer driver and the data connection.

14. The computer-implemented method of claim 13, further comprising the step of exporting a function to the printer driver.

15. The computer-implemented method of claim 13, wherein the network address is an Internet Protocol address.

16. The computer-implemented method of claim 13, wherein the network address is a proprietary network protocol address.

17. The computer-implemented method of claim 16, wherein the proprietary network protocol is an Internetwork Packet Exchange protocol.

18. The computer-implemented method of claim 13, wherein the storing step further comprises storing a port name corresponding to the at least one selected network accessible printer in an internal value table of the client machine.

19. A computer-readable medium for a printer driver on a client machine to communicate with a network printer communicatively coupled to a print server, comprising:
   means adapted for loading a shared printer driver from an associated printer driver to a client machine wherein the loaded printer driver maps output to a default print queue;
   means adapted for searching a computer network for at least one network accessible printer corresponding to the default print queue, which network accessible printer is accessible by the client machine via a data connection between the printer an associated server;
   means adapted for selecting at least one network accessible printer corresponding to the default print queue, which network accessible printer is located by an associated user;
   means adapted for retrieving identifier data associated with each selected network accessible printer;
   means adapted for retrieving a network address corresponding to the at least one network accessible printer selected by the user;
   means adapted for storing the network address, corresponding identifier data, and a network path corresponding to the at least one selected network accessible printer in an internal value table of the client machine; and
   means adapted for mapping a port from the at least one selected network accessible printer to a port on on the client machine corresponding to the default print queue in accordance with the value table, wherein the default print queue able to pass though an actual port associated therewith for bidirectional data communication, inclusive of printer status information, with the at least one selected network accessible printer via the downloaded printer driver and the data connection.

20. The computer-readable medium of claim 19, further comprising means adapted for exporting a function to the printer driver.

21. The computer-readable medium of claim 19, wherein the network address is an Internet Protocol address.

22. The computer-readable medium of claim 19, wherein the network address is a proprietary network protocol address.

23. The computer-readable medium of claim 22, wherein the proprietary network protocol is an Internet Packet Exchange protocol.

24. The computer-readable medium of claim 19, further comprising means adapted for storing a port name corresponding to the at least one selected network accessible printer in an internal value table of the client machine.

* * * * *